J. HOLT.
Privy-Houses.

No. 147,266.  Patented Feb. 10, 1874.

Witnesses.  Inventor.
  Jared Holt

UNITED STATES PATENT OFFICE.

JARED HOLT, OF ALBANY, NEW YORK.

IMPROVEMENT IN PRIVY-HOUSES.

Specification forming part of Letters Patent No. 147,266, dated February 10, 1874; application filed December 9, 1873.

*To all whom it may concern:*

Be it known that I, JARED HOLT, of the city and county of Albany and State of New York, have invented an Improvement in Privy-Houses, of which the following is a specification:

My invention consists in constructing privy-houses in the manner herein shown and described, for the purpose of producing a thorough ventilation of the vault, so that all unpleasant effluvia may be carried off and dispelled.

Figure 1:
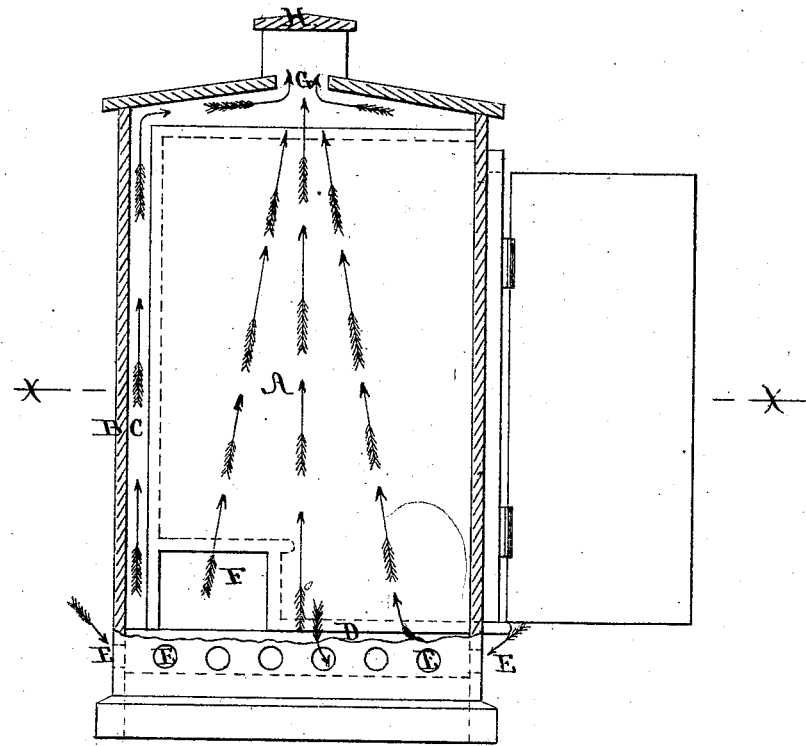
Figure 2:
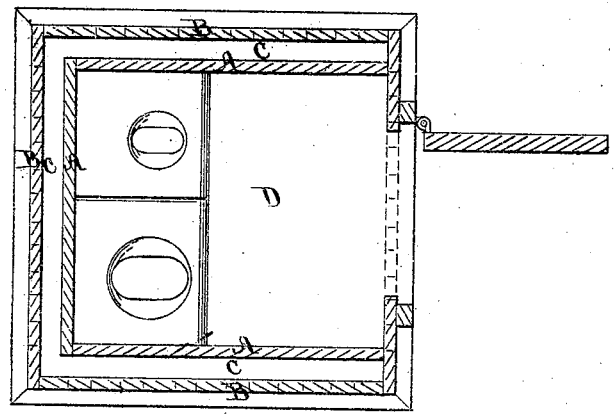

In the accompanying drawings, making a part of this specification, Figure 1 is a side elevation of the building, showing a portion of the outer siding removed; and Fig. 2 a horizontal section at the line $x\, x$.

As shown in the drawings, A is an interior chamber or compartment corresponding to the usual privy building, the floor of which is raised above the base of the building, where it rests upon the vault. This compartment is surrounded on one or more of its sides and top by the outer casing B, so as to leave a free unobstructed ventilating-passage, C, between the two parts of the structure. Beneath the floor D the outer casing B is perforated by a series of openings, E, for the admission of fresh air into the vault. An opening, F, equal to the height and width of the seat, is made through each side of the compartment A, which, communicating with the passage C, carries away the foul air from the space beneath the seat. An opening, G, is also formed through the roof of the outer casing B, and is protected from inclement weather by the cap-piece H.

As the foul vapors arise and pass upward through the ventilating-passages C to and out of the opening G, as indicated by the ascending arrows in Fig. 1, fresh air is admitted through the openings E to replace the foul air, and by this means a perfect circulation is established, whereby all the impure vapors are expelled and the building rendered pure and wholesome. Another advantage derived from the free admission of fresh air to the vault through the openings E is that it dries the soil in the vault by more rapidly evaporating the liquids.

I claim as my invention—

The outer casing B, having the inlet-openings E, for the admission of fresh air to the vault, in combination with the walls of the interior chamber A, arranged to form the ventilating-passages C, substantially as and for the purpose specified.

JARED HOLT.

Witnesses:
S. J. HAIGHT,
WILLIAM H. LOW.